United States Patent Office 3,532,680
Patented Oct. 6, 1970

3,532,680
POLYMERIZATION BY CONTACT WITH
MATERIALS HAVING POSITIVE HOLES
THEREIN
Walter Cooper, Henrietta, N.Y., assignor to Eastman
Kodak Company, Rochester, N.Y., a corporation of
New Jersey
No Drawing. Filed Feb. 23, 1967, Ser. No. 617,807
Int. Cl. C08f 3/90, 7/12
U.S. Cl. 260—88.3                              15 Claims

ABSTRACT OF THE DISCLOSURE

Process for polymerizing ethylenically unsaturated monomers by contacting said monomer with a semiconductor material having positive holes formed therein. Typical semiconductor materials which can be used are metal salt semiconductors and metal oxide semiconductors and positive holes can be formed in said semicondudtor materials by contact with an oxidizing medium such as bromine solutions, chlorine solutions, and the like.

This invention relates to a novel process for initiating polymerization in ethylenically unsaturated monomers. In one aspect this invention relates to the polymerization of unsaturated compounds by contact with a crystalline material having positive holes therein. In another aspect this invention relates to the formation of positive holes in a crystalline material by contact with an oxidizing medium and further contacting of said crystalline material with an unsaturated monomer to initiate polymerization.

Generally free radical systems introduce considerable catalyst residues into polymer products and necessitate considerable purification treatment thereof. Moreover, these catalysts are lost in most cases, unless complex recovery procedures are employed. In other polymerization systems, irradiation with ultraviolet light is employed; irradiation processes have disadvantageous power requirements and impose expensive reactor limitations on a process.

Therefore, an object of this invention is to provide a novel catalyst system.

Another object of this invention is to provide a novel process for initiating polymerization in monomers.

Another object of this invention is to provide a method for initiating polymerization of monomers without residual catalyst contamination in the product.

Another object of this invention is to provide a catalyst system which can be constantly activated for further polymerization initiation.

These and other objects of the invention are achieved by a novel system of initiating polymerization by use of positive holes in a crystalline semiconductor material. The positive holes in the material are electropositive atoms formed by contacting said crystalline material with an oxidizing medium. The positive holes migrate by progressive capture of electrons by electron deficient atoms. When an ethylenically unsaturated monomer is brought into contact with said material, the electron deficient atoms apparently attack ethylenic bonds formed by pairs of shared electrons at the

sites in the monomer and initiate polymerization.

In one aspect of this invention, a semiconductor such as silver bromide septum is contacted with an oxidizing solution such as saturated bromine water or nitrosyl chloride. The adsorbed bromine or chlorine atoms capture electrons from neighboring crystalline halide ions. The positive holes diffuse to the opposite side of the septum where a solution of ethylenically unsaturated monomers such as acrylamide is in contact with said septum. Polymerization is initiated resulting in high molecular weight polyacrylamide.

The reaction proceeds by the regeneration of positive holes within the crystalline material. As oxidizing solutions react with the crystalline semiconductor material, the conductivity of the crystal increases due to the formation of positive holes. Luckey and West, J. Chem., Physics, 24, 879 (1956), in a study of the effect of bromine on the dark conductivity of silver bromide have represented the process in terms of a "chemical" equation:

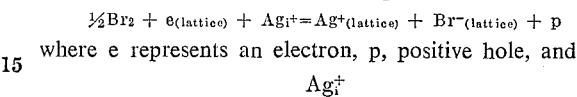

where e represents an electron, p, positive hole, and $$Ag_i^+$$

interstitial silver ion. The concentration of bromine induced positive holes may be given by $$(p) = \frac{K(Br_2)^{1/2}}{[Ag_v^+]}$$

where K is an equilibrium constant, $[Ag_v^+]$, the concentration of silver ion vacancies and $(Br_2)$, the concentration of molecular bromine. Since the concentration of ion vacancies remains practically constant in a material such as silver halide, the concentration of positive holes is proportional to the square root of the concentration of the oxidizing agent, such as bromine, in equilibrium with the crystal. In the present invention we have found that the rate of polymerization with crystalline semiconductors is proportional to the square root of the oxidizing agent concentration, which is consistent with the work of Luckey and West.

The unique system of positive hole polymerization can be illustrated by comparison between a cellophane septum and a silver halide septum used in a reaction vessel separating a saturated solution of bromine in carbon tetrachloride from a solution of acrylamide monomer (60 grams/100 ml. of $H_2O$). With the cellophane septum, a white crystalline product, insoluble in water, soluble in methyl alcohol was obtained, identified by M.P. 133° C. and by C, H, N, Br analysis as alpha, beta-dibromopropionamide. Bromine apparently diffuses through cellophane in the molecular condition, and on emergence at the side in contact with the unsaturated monomer, undergoes the normal addition reaction of molecular bromine to the double bond. In the reaction vessel with the silver halide septum the acrylamide monomer polymerizes to a polymer having an average molecular weight of $6 \times 10^6$. The fact that no dibromopropionamide is formed shows that no molecular bromine as such diffuses through the silver bromide, and that no significant formation of molecular bromine occurs at the crystal surface in contact with the monomer solution. Polymerization is apparently initiated by the diffusion of positive holes through the silver halide septum.

Any material which is capable of positive hole formation can be used in this polymerization process. Semiconductors such as the metal salt semiconductors and oxide semiconductors are utilized in the preferred embodiments of the invention. Typical metal salt semiconductors include silver chloride, silver bromide, silver iodide, cuprous bromide cuprous iodide, cuprous chloride, mercuric iodide, mercuric bromide, mercuric chloride, lead iodide, lead chloride, lead bromide, and the like. Typical oxide semiconductors include cuprous oxide, zinc oxide, lead oxide, and the like. Semiconductor materials with numerous crystalline dislocations are also effective in the polymerization process. However, materials with a relatively high degree of perfection are generally preferred in the process.

The reaction vessel may be constructed in any manner as ultraviolet light sources are not required for carrying out the reaction; however, ultraviolet light sources could be used to increase the rate of reaction or provide additional initiation of polymerization. Since solutions can be contained in both chambers of the reaction vessel when a septum is employed, the pressure can be controlled to permit use of very thin septums, thereby increasing the diffusion rate of positive holes to the opposite sides of the septum.

The oxidizing medium can be any solution or gaseous medium which will oxidize the surface of the semiconductor material and thereby produce positive holes within the semiconductor material. Typical preferred oxidizing solutions which are effective with the metal salt semiconductors are nitrosyl chloride, saturated bromine water, saturated chlorine water, bromine in carbon tetrachloride, iodochloride, bromomonochloride, nitrosyl bromide, and the like. Solutions of cerric nitrate, potassium permanganate, and similar oxidizing agents which liberate a halogen from a silver halide can also be utilized with the metal salt semiconductors.

Typical oxidizing materials which can be used with the oxide semiconductors are $O_2$, and other positive-hole inducing agents.

Generally any ethylenically unsaturated monomer can be polymerized by positive hole initiation. Typical monomers which can be polymerized by positive hole polymerization are acrylamide monomers such as methacrylamide, alpha-dimethylaminopropyl acrylamide and the like; acrylates such as calcium acrylate, methylacrylate, ethylacrylate, and the like; and vinyl compounds such as styrene, N-vinylpyrollidone, vinyl ethyl ether, vinyl butyrate, butadiene and the like or any mixtures of the monomers. Other monomers such as N,N'-methylenebisacrylamide, divinyl benzene and the like can be included in monomer solutions to initiate crosslinking in the polymer chain.

In the preferred embodiments of the invention, septums made from the semiconductor materials are used to initiate polymerization. Generally septums having a thickness of about 15 micons to about 1000 microns are effective to initiate polymerization. In a preferred embodiment the sptum has a thickness of about 25 microns to about 450 microns.

A typical apparatus for the process comprises a silver halide crystal septum clamped between the 1.33 cm.$^2$ open ends of two glass cells fitted with Teflon gaskets. The monomer solution is added to one cell equipped with a stainless steel stirrer near the silver halide surface; the oxidizing solution is added to the other cell.

During the ocurse of the polymerization reaction, a considerable increase in viscosity is often encountered; the highest viscosity occurring adjacent the silver halide septum. A vibrating arm with an attached blade or impeller can be mounted in the cell to agitate the reaction mixture and prevent any accumulation of high molecular weight material adjacent the silver halide septum to expedite the reaction.

The invention can be further illustrated by the following examples, although it will be understood that the examples are included merely for purposes of illustration and are not intended to limit the scope of the invention unless otherwise indicated.

EXAMPLE 1

A reaction vessel containing a silver bromide septum 46 microns in thickness is contacted with a 60 percent acrylamide-water solution on one side of the septum and a saturated bromide-water solution on the other side. The reaction is continued for 33.3 hours. A polyacrylamide polymer having an average molecular weight of $6 \times 10_6$ was formed in the reaction.

Similar results are obtained when calcium acrylate, alpha-dimethylaminopropyl acrylamide, methacrylamide, N-vinylpyrollidone, methylmethacrylate and styrene monomers are used as a monomer and polymerized by the above procedure and when nitrosyl chloride is used in place of saturated bromine-water solution.

EXAMPLE 2

The effects of septum thickness and various oxidation solutions are shown in the following table:

| Septum silver halide | Septum thickness, microns | Monomer | Oxidizing agent | Reaction time, hrs. | Polymer wt., gms. |
| --- | --- | --- | --- | --- | --- |
| AgBr | 160 | Acrylamide 60% aqueous | 3% bromine in $CCl_4$ | 3.1 | 0.132 |
| AgCl pretreated for 30 min. in saturated chlorine water. | 98 | Acrylamide 59% aqueous plus 2% N,N-methylenebisacrylamide. | Saturated chlorine water | 18 | 3.64 |
| AgBr | 60 | 6.5 ml. acrylamide 59% aqueous plus 2% N,N-methylene bis-acrylamide. | 6.5 ml. 0.1 M ceric nitrate in 0.4 M nitric acid. | 24 | 3.48 |
| AgBr | 43 | 30% methacrylamide | 25% bromine in $CCl_4$ | 16.75 | 0.745 |
| AgBr pressed pellet | 242 | 60% sol. acrylamide in water | do | 20 | 0.02 |

Although this invention has been described in considerable detail with particular reference to certain preferred embodiments thereof, variations and modifications can be effected within the spirit and scope of the invention as described hereinabove, and as defined in the appended claims.

I claim:

1. A polymerization process comprising contacting one side of a metal salt or metal oxide semiconductor septum with an ethylenically unsaturated compound and contacting the other side of said septum with an oxidizing agent capable of forming positive holes in said semiconductor septum.

2. A process according to claim 1 wherein said septum is from about 15 to about 1000 microns thick and said oxidizing agent and said ethylenically unsaturated compound are isolated from each other.

3. A process according to claim 1 wherein said semiconductor septum comprises a silver halide.

4. A process according to claim 1 wherein said septum comprises a metal salt semiconductor.

5. A process according to claim 1 wherein said septum comprises a metal oxide semiconductor.

6. A process according to claim 1 wherein said oxidizing agent is a halide.

7. A process according to claim 1 wherein said oxidizing agent is nitrosyl chloride.

8. A process according to claim 1 wherein said ethylenically unsaturated compound is an acrylamide, an acrylate, a vinyl pyrrolidone or mixtures thereof.

9. A process according to claim 1 wherein said septum consists of silver bromide.

10. A process according to claim 1 wherein said septum comprises a bromide-metal salt and said oxidizing agent is a chloride solution.

11. A process for free radical polymerization of ethylenically unsaturated compounds comprising contacting one side of a silver halide septum with an ethylenically unsaturated material while contacting the opposite side of said septum with an oxidizing solution.

12. A process according to claim 11 wherein said ethylenically unsaturated compound is an acrylamide, an acrylate, a vinyl pyrrolidone or mixtures thereof.

13. A process according to claim 12 wherein said oxidizing agent is nitrosyl chloride and said silver halide septum comprises a silver bromide.

14. A process for the free radical polymerization of ethylenically unsaturated compounds comprising contacting one side of a silver halide septum with an ethylenically unsaturated material while contacting the other side of said septum with a halogen solution.

15. The process of claim 14 wherein said septum has a thickness or from about 25 to about 450 microns.

References Cited
UNITED STATES PATENTS

| | | | |
|---|---|---|---|
| 3,038,800 | 6/1962 | Luckey et al. | 260—89.7 |
| 3,365,433 | 1/1968 | Manson et al. | 260—91.1 |

HARRY WONG, JR., Primary Examiner

U.S. Cl. X.R.

204—159.22; 260—80, 80.3, 82.1, 85.7, 86.1, 88.1, 89.1, 89.5, 89.7, 91.1, 93.5, 94.2